United States Patent
Sanders (10) Patent No.: US 12,153,677 B2
(45) Date of Patent: Nov. 26, 2024

(54) INCREMENTAL UPDATES TO MALWARE DETECTION MODELS

(71) Applicant: Sophos Limited, Abingdon (GB)

(72) Inventor: Hillary Margaret Sanders, Portland, OR (US)

(73) Assignee: Sophos Limited, Abingdon (GB)

( * ) Notice: Subject to any disclaimer, the term of this patent is extended or adjusted under 35 U.S.C. 154(b) by 340 days.

(21) Appl. No.: 17/667,960

(22) Filed: Feb. 9, 2022

(65) Prior Publication Data

US 2022/0253526 A1   Aug. 11, 2022

Related U.S. Application Data

(60) Provisional application No. 63/148,341, filed on Feb. 11, 2021.

(51) Int. Cl.
| | |
|---|---|
| *G06F 21/00* | (2013.01) |
| *G06F 18/214* | (2023.01) |
| *G06F 21/55* | (2013.01) |
| *G06F 21/56* | (2013.01) |
| *G06N 3/04* | (2023.01) |

(52) U.S. Cl.
CPC .......... *G06F 21/564* (2013.01); *G06F 18/214* (2023.01); *G06F 21/554* (2013.01); *G06F 21/566* (2013.01); *G06N 3/04* (2013.01)

(58) Field of Classification Search
None
See application file for complete search history.

(56) References Cited

U.S. PATENT DOCUMENTS

| | | |
|---|---|---|
| 10,599,844 B2 | 3/2020 | Schmidtler et al. |
| 11,409,869 B2 | 8/2022 | Schmidtler et al. |
| 2015/0254555 A1* | 9/2015 | Williams, Jr. ......... G06N 3/045 706/14 |
| 2018/0351972 A1* | 12/2018 | Yu ........................ H04L 63/1416 |
| 2021/0314333 A1* | 10/2021 | Krisiloff .................. G06N 5/02 |

OTHER PUBLICATIONS

Kim, Minha et al., "FReTAL: Generalizing Deepfake Detection using Knowledge Distillation and Representation Learning", arXiv:2105.13617v1 May 28, 2021, 12 Pages.
Tariq, Shahroz et al., "One Detector to Rule Them All", arXiv:2105.00187v1 May 1, 2021, 14 Pages.
Wang, Xiaojie et al., "KDGAN: Knowledge Distillation with Generative Adversarial Networks", 32nd Conference on Neural Information Processing Systems 2018, 12 Pages.
Robins, Anthony et al., "Catastrophic Forgetting, Rehearsal, and Pseudorehearsal", Science: Journal of Neural Computing, Artificial Intelligence and Cognitive Research, Jul. 1995, 37 Pages.

(Continued)

*Primary Examiner* — Andrew J Steinle
(74) *Attorney, Agent, or Firm* — Strategic Patents, P.C.

(57) ABSTRACT

A machine learning model is sequentially fine-tuned with new training data as the training data becomes available. By using a suitable mix of old and new data, and weighting samples in the training data by age, the model can be efficiently updated to maintain accuracy against a changing malware landscape without manual modifications of the network layers or the computational expense of full retraining.

20 Claims, 7 Drawing Sheets

(56) References Cited

OTHER PUBLICATIONS

Atkinson, Craig et al., "Pseudo-Rehearsal: Achieving Deep Reinforcement Learning without Catastrophic Forgetting", arXiv:1812.02464v6 Dec. 16, 2020, 46 Pages.

Kemker, Ronald et al., "Measuring Catastrophic Forgetting in Neural Networks", arxiv.org/abs/1708.02072 Nov. 9, 2017, 15 Pages.

Lopez-Paz, David et al., "Gradient Episodic Memory for Continual Learning", arXiv:1706.08840v5 Nov. 4, 2017, 17 Pages.

Atkinson, Craig et al., "Pseudo-Recursal: Solving the Catastrophic Forgetting Problem in Deep Neural Networks", arXiv:1802.03875 May 7, 2018, 8 Pages.

Hayes, Tyler et al., "Memory Efficient Experience Replay for Streaming Learning", arxiv.org/abs/1809.05922v2 Feb. 23, 2019, 8 Pages.

\* cited by examiner

INCREMENTAL UPDATES TO MALWARE DETECTION MODELS

RELATED APPLICATIONS

This application claims the benefit of U.S. Prov. App. No. 63/148,341 filed on Feb. 11, 2021, the entire content of which is hereby incorporated by reference.

FIELD

The present disclosure generally relates to cybersecurity, and more particularly, to efficiently updating machine learning-based models used for classification of maliciousness.

BACKGROUND

In the field of cybersecurity, machine learning models are often used to detect malicious artifacts. These models tend to become less accurate over time when applied to a rapidly changing malware environment where malware evolves quickly and new malware exploits regularly emerge. It is possible to retrain a machine learning model based on samples from the current malware environment, however this can be expensive and inefficient. It is also possible to retrain neural network models and the like incrementally with new data; however, this frequently results in so-called catastrophic forgetting where a model loses the ability to perform the classification for which it was originally trained. There remains a need for techniques to efficiently and incrementally update a malware detection model to maintain detection accuracy against an evolving malware landscape.

SUMMARY

A machine learning model is sequentially fine-tuned with new training data as the training data becomes available. By using a suitable mix of old and new data, and weighting samples in the training data by age, the model can be efficiently updated to maintain accuracy against a changing malware landscape without manual modifications of the network layers or the computational expense of full retraining. This may be particularly beneficial when characteristics of analysis objects change continuously over time, as with malware, so that classifications can accurately be performed on newly-emerging threats without losing the ability to classify previously known threats.

In general, in an aspect, a method for updating a trained model with new samples, may include receiving new samples to be used to update the model, determining a number of the new samples to select for updating, determining a number of past samples to select based on the number of new samples selected for updating, selecting new samples based on the determined number of new samples, selecting past samples based on the determined number of past samples, and updating the trained model using the selected new samples and the selected past samples.

In some implementations, updating the trained model may include using machine learning techniques to train the existing model using the selected new samples and the selected past samples. In some implementations, the model is a malware classifier. In some implementations, the model is a maliciousness classifier. In some implementations, the model is a deep learning neural network.

In some implementations, the number of past samples is determined as a percentage or a multiple of the number of new samples to be used for updating. In some implementations, the number of past samples is determined based on a desired ratio of past samples and new samples. In some implementations, the method is performed periodically to update the trained model using recently collected samples as new samples.

In some implementations, the past samples are selected randomly. In some implementations, past samples are selected with weighting towards more recent samples. In some implementations, the number of new samples is determined by identifying a number of new samples to be used as test data. In some implementations, the number of new samples is determined by identifying a number of new samples to be used as training data.

In general, in an aspect, a system for maintaining a trained model with new samples may include a sample repository for receiving new samples to be used to update the model. The system may include a sample number determination system for determining a number of the new samples to be used for updating and for determining a number of past samples to select based on the number of new samples to be used for updating. The system may include a sample selector for selecting new samples based on the determined number of new samples and for selecting past samples based on the determined number of past samples. The system may include a training engine for updating the trained model using the selected new samples and the selected past samples. The system may include a security agent for using the updated trained model to detect malware.

In some implementations, the new samples are updated periodically. In some implementations, the trained model is a maliciousness classifier, such as a malware classifier. In some implementations, the trained model is a deep learning neural network. In some implementations, the sample number determination system determines the number of new samples by identifying a number of new samples to be used as training data. In some implementations, the sample number determination system determines the number of past samples based on a percentage of the number of new samples. In some implementations, the past samples are selected randomly with weighting toward more recent samples.

In general, in an aspect, a computer program product for updating a previously-trained machine learning malware classification model with new samples includes computer executable code embodied in a non-transitory computer-readable medium that when executed on one or more computing devices may perform steps including one or more of: receiving new samples to be used to update a previously-trained machine learning malware classification model, determining a number of the new samples to be selected for use in updating, determining a number of past samples to be selected as a percentage of the number of new samples to be selected for updating, selecting new samples based on the determined number of new samples, selecting past samples based on the determined number of past samples, and updating the trained model using the selected new samples and the selected past samples. In some implementations, the percentage may be a percentage is in the range from 80% to 120%, 90% to 110%, or 95% to 105%.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, empha

DETAILED DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

Figure 1:
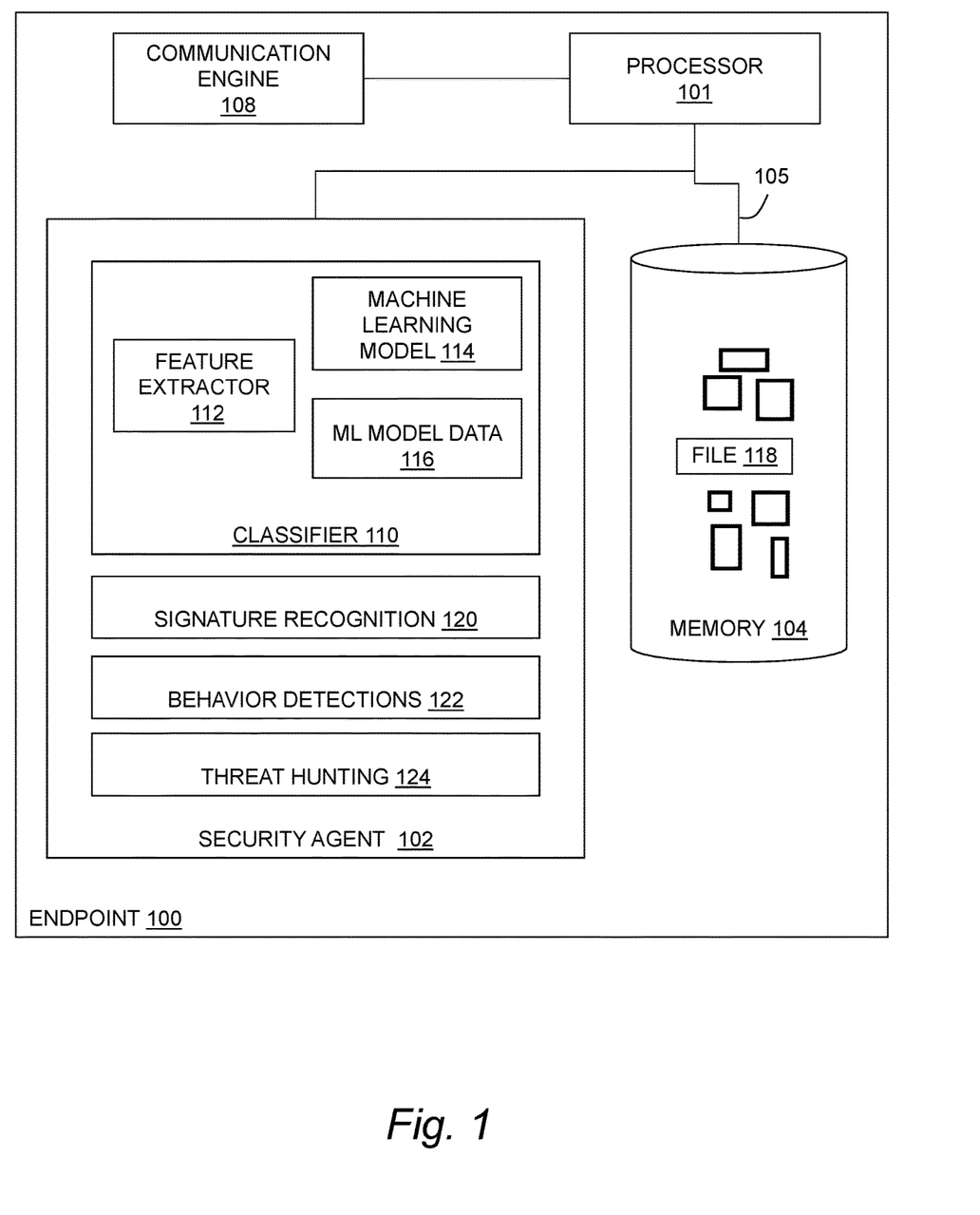
- FIG. 1 illustrates a block diagram of an endpoint according to embodiments.

FIG. 1 is a block diagram of an endpoint 100 that includes one or more cybersecurity systems using machine learning models as described here to detect malicious objects. The endpoint 100 may be a hardware-based computing device and/or a multimedia device, such as, for example, a compute device, a server, a desktop compute device, a smartphone, a tablet, a laptop, and/or the like, or any other compute instance such as a virtual machine, cloud-based computing resource, or the like. In general, the endpoint 100 may include a processor 101, a memory 104, and a communication engine 108.

The processor may, for example, include a hardware based integrated circuit (IC) or any other suitable processing device(s) configured to run and/or execute a set of instructions or code. For example, the processor 101 may be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), and/or the like. The processor 101 may be operatively coupled to the memory 104 through a system bus 105 (for example one or more of an address bus, data bus, control bus, serial bus).

The processor 101 may be configured by computer-executable code that, when executing on the processor 101, implements a security agent 102. The security agent 102 may include a classifier 110, which may be implemented using machine learning techniques. The classifier 110 may include a feature extractor 112, a machine learning model 114, and machine learning model data 116. Each of the feature extractor 112, the machine learning model 114, and the machine learning model data 116 may be stored in memory 104 as data and/or computer code, and executed by processor 101 to classify code segments as generally described herein.

The feature extractor 112 may be configured to receive an analysis object such as a file, a text stream, a binary object, file metadata, a communication object (such as a text, electronic mail, instant message, and the like), a network stream, behavior information, a code segment, a URL, as well as combinations of the foregoing, as an input. Based on this input, the feature extractor 112 may output one or more feature vectors associated with the analysis object. In other words, the feature extractor 112 may extract features from the analysis object and form a feature vector descriptive of the analysis object and including indications or characterizations of features in any one or more dimensions used by the feature vector.

For example, in some exemplary implementations in which the analysis object is an executable file or script, the feature extractor 112 may identify static features in a file such as headers, variable definitions, routines, sub-routines, strings, elements, subtrees, tags and/or the like. A representation of these features may be used to define a feature vector. For example, in some implementations, the feature extractor 112 may normalize each feature and/or input each feature to a hash function to produce a hash value. The feature extractor 112 may, using these hashed, normalized, or otherwise quantified features, form a feature vector of any suitable size and dimensions. For example, a hash value for one of the features may provide a position and/or bucket in the feature vector and a value at that position and/or a bucket in the feature vector may be incremented each time a hash value for a feature identifies that position and/or bucket. As another example, in other implementations, a value associated with that feature may be included in the feature vector at that position and/or bucket. In some instances, the positions and/or buckets to which each feature can potentially hash may be determined based on the length and/or size of that feature. For example, strings having a length within a first range can potentially hash to a first set of positions and/or buckets while strings having a length within a second range can potentially hash to a second set of positions and/or buckets. The resulting feature vector, however assembled, may characterize the features of the structured file.

For example, the feature extractor 112 may receive a portable executable (PE) file and identify features within that file such as strings, elements, subtrees, tags, function calls, and so forth. The feature extractor 112 may then provide each feature as an input to a hash function or other function to generate a value for that feature. The feature extractor 112 may use the values to form a feature vector representative of and/or indicative of the features in the file. Likewise, the feature extractor 112 may receive an HTML, file, an XML file, or any other document file or the like, and identify features (e.g., strings, elements, subtrees, tags, function calls, etc.) within that file. The feature vector may be provided as an input to the machine learning model 114.

For example, in some exemplary implementations in which the analysis object is a file, a binary file, a text file or stream, or a message, the feature extractor 112 may characterize bits and/or characters in textual elements such as message headers, strings, sub-strings, elements, tags and/or the like. A representation of features may be used to define a feature vector. For example, in some implementations, the feature extractor 112 may identify features of text by extracting words using a predefined vocabulary and generating uni-gram and bi-gram tokens from the selected words. Positional weights may be assigned to tokens to encode positional information, and one or more transformations may be applied to the weights to add non-linearity, e.g., $\log(w)$, $\exp(w)$, or $w^2$.

The analysis object may, for example, include files, documents, processes, network flows, URL's or any other suitable analysis object or combination of objects. Recognition tasks may be applied, for example, to features determined by static analysis, dynamic analysis, behavior analysis, activity analysis, or any other suitable features. This may include recognition of semantic content, code behavior, program flow, and so forth. In addition to features of an object of analysis, context information also may be included in training data. In various implementations, contextual information may include an attribute indicator that may indicate a family or type of malware or malicious object. Context may also or instead include date and time information, network location information, computing context information, and so forth.

In some implementations, hash functions may be used as transformation functions and/or to identify a position and/or bucket in the feature vector and a value at that position and/or bucket in the feature vector may be incremented each time a hash value for a feature identifies that position and/or bucket. As another example, a value associated with that feature may be included in the feature vector at that position and/or bucket. In some instances, the positions and/or buckets to which each feature can potentially hash may be determined based on the length and/or size of that feature. For example, strings having a length within a first range can potentially hash to a first set of positions and/or buckets while strings having a length within a second range can potentially hash to a second set of positions and/or buckets. The resulting feature vector may be indicative of the features of the structured file.

For example, the feature extractor 112 may receive a message and identify text features within that message, such as strings, sub strings, tokens, etc. The feature extractor 112 may then provide each feature as an input to a transformation function to generate a value for that feature. The feature extractor 112 may use the values to form a feature vector representative of and/or indicative of the text features of the message. Likewise, the feature extractor 112 may receive an HTML file, an XML file, or any other document file or the like, and identify features within that file. The feature vector may be provided as an input to the machine learning model 114.

Likewise, the feature extractor 112 may receive contextual information for an analysis object, such as information associated with a message or file. This may include, as examples not intended to be limiting, one or more of an indication of an origin of a file, a reputation of an address or a domain name associated with a file, transmission information, date and time stamps, time zones, servers associated with transmission. The feature extractor may perform specified operations on contextual information, e.g., to normalize or reduce it, or to emphasize certain features of the contextual information. For example, a feature extractor may use hash functions or transformation functions on the contextual information. In some implementations, the resulting contextual information may be provided as an input to the machine learning model 114.

More generally, feature vectors may be formed using any combination of the techniques, or any other techniques useful for quantitatively and/or objectively characterizing feature of the analysis objects of interest. This may include using hashes of code features or text features, symbolic feature representations, representations of behaviors or flow control, signatures, word embedding features, n-gram features, byte features or other binary program features, and so forth. Still more generally, any quantitative or object features suitable for representation in a feature vector and helpful in identifying malware using the machine learning techniques described herein may be usefully employed as features for training and detection.

The machine learning model 114 may be any suitable type of machine learning model such as, for example, a neural network, a decision tree model, a gradient boosted tree model, a random forest model, a deep neural network, or other suitable model. The machine learning model 114 may be configured to receive a feature vector associated with an analysis object, and context information associated with the analysis object, and output an analysis result, such as a score indicating a classification of the analysis object, and/or a probability or other score indicating a likelihood that the analysis object is, for example, malicious. The machine learning model may provide an output indicating a threat classification. The threat classification may indicate an evaluation of the likelihood that the analysis object is a threat. For example, the threat classification may classify an analysis object into various categories such as, for example, benign, potentially malicious, malicious, type of malicious content/activity, class of malicious content/activity, attack family, or another suitable threat classification. The threat classification may provide an output within a range (for example between 0 and 10, between 0 and 1, between 0 and 4) that indicates a probability of maliciousness.

The memory 104 of the endpoint 100 may be, for example, a random access memory (RAM), a memory buffer, a hard drive, a read-only memory (ROM), an erasable programmable read-only memory (EPROM), and/or a combination of these or other types of memory. The memory 104 can store, for example, one or more software modules and/or code that can include instructions to cause the processor 101 to perform one or more processes, functions, and/or the like (e.g., the feature extractor 112 and the machine learning model 114). In some implementations, the memory 104 may include a portable memory (for example, a flash drive, a portable hard disk, and/or the like) that may be operatively coupled in communication with the processor 101. In other instances, the memory 104 may include remote memory operatively coupled with the endpoint 100. For example, the memory may include a remote database server operatively coupled to the malicious content detection device, or any other cloud data resource or the like.

The memory 104 may store machine learning model data 116 and an analysis object such as a file 118. While the analysis object is illustrated as a file, it will be understood that the analysis object may more generally include any of the analysis objects described herein. The machine learning model data 116 may include data generated by the machine learning model 114 during processing of the file 116. The machine learning model data 116 can also include data used by the machine learning model 114 to process and/or analyze an analysis object, such as weights associated with the machine learning model, decision points associated with the machine learning model, and/or other information related to the machine learning model and the structure or behavior thereof.

The analysis object, shown here for example as a file 118, may be, for example a binary file or a text file. The 118 may be or may include an executable file, an email message, a representation of a text stream, a document, a text message, a social media post, a web site post and/or another suitable analysis object. For example, in various implementations, the file may be at least one of an executable (EXE) file, a Hypertext Markup Language (HTML) file(s), a JavaScript file(s), an Extensible Markup Language (XML) file, a Hypertext Preprocessor (PHP) file(s), Microsoft® office documents (for example, Word®, Excel®, PowerPoint®, and/or the like), a uniform resource locator (URL), Android Package Kit (APK) files, Portable Document Format (PDF) files, and/or any other files having defined structure suitable for analysis. The file 118 can include or can reference software code, a webpage(s), a data file(s), a model file(s), a source file(s), a script(s), a process(es), a binary executable file(s), data and/or a table(s) in a database system, a development deliverable(s), an active content(s), a word-processing document(s), an e-mail message(s), a text message(s), data associated with a device or an entity (e.g., a network-connected compute device and/or computer system, a server, a smartphone, a tablet a laptop, a multimedia device, etc.), and/or the like. In some instances, the file 118 may be analyzed by the processor 101 of the endpoint 100 to identify whether the file is malicious, as described in further detail herein.

In some implementations, the analysis object may be, for example, a network stream or a text stream. A representation of the network stream or text stream may be stored in the memory 104. A representation of the network stream or text stream may be included in the file 118. The file 118 may include the output of one or more network sensors recording network traffic. For example, a network stream may be extracted from packets of network traffic. The file 118 may include data extracted from a data lake of sensor data.

Security recognition tasks performed by a given security agent 102 may include but are not limited to the recognition of maliciousness, classification of a security threat, detection of suspiciousness, or any other relevant analysis result. The object of recognition tasks may be, for example, text files, text messages, email messages, social network posts, web site posts, documents, text streams, message streams, or any other suitable analysis object. Recognition tasks may be undertaken, for example, through analysis of features extracted from data. In addition to features of an object of analysis, such as binary or text features, context information also may be used in a security recognition task. In various implementations, contextual information may include message information, such as message header information. Context information may include sender or receiver addresses, sender or receiver domains, reputations associated with a sender or receiver, profile information associated with a sender or receiver, digital signature information, time zone information, timestamp information, transmission path information, attachment file size, attachment information, domain reputation information, universal resource locators (URLs), fonts or other message content context information, or any other suitable contextual information. For example, contextual information may be used in combination with file content information to improve the performance of a recognition task.

The security agent 102 may also include a signature recognition engine 120, which may be used to perform static analysis on analysis objects. For example, the signature recognition engine may be an anti-malware engine, and include traditional anti-virus capability. The signature recognition engine may use rules and signature data to analyze features of analysis objects, again as an exemplary analysis object, file 118. The signature recognition engine may use rules and signature data to recognize malicious objects. The signature recognition engine 120 may operate in coordination with the classifier 110 and other elements of the security agent 102 to evaluate analysis objects for maliciousness.

The security agent 102 may also include a behavior detection engine 122. The behavior detection engine 122 may monitor behavior of processes running on the endpoint 100 to recognize malicious activity. For example, the behavior detection engine 122 may recognize attempts to access application programming interfaces (APIs) associated with an operating system running on the endpoint 100, or attempts by a process to communicate using the communication engine 108. More generally, any behavior, events, actions, or the like that can be detected by the security agent 102 and used for detecting malware may be used as behaviors by the behavior detection engine 122. The behavior detection engine 122 may operate in coordination with the signature recognition engine 120 and/or the classifier 110 and other elements of the security agent 102 to evaluate analysis objects for maliciousness. In one aspect, these components may operate independently to detect malicious code. In another aspect, data from one component (e.g., the signature recognition engine 120 or the behavior detection engine 122) may provide data to another component (e.g., the classifier 110) for use in malware detection.

The security agent 102 may also include a threat hunting engine 124. The threat hunting engine 124 may be used by security analysts, e.g., at a remote threat management facility, to access and analyze activity on the endpoint 100. The threat hunting engine 124 may generate event notifications and alerts for a threat hunting application on the endpoint, or for communication to a threat management facility for remote analysis and disposition. The threat hunting engine 124 may provide a capability for analysts to investigate notifications and alerts generated by the threat hunting engine 124, the signature recognition engine 120, the classifier 110 and/or other elements of the security agent 102. The threat hunting engine 124 may operate in coordination with the signature recognition engine 120 and/or the classifier 110 and other elements of the security agent 102 to investigate analysis objects.

The communication engine 108 may be a hardware device operatively coupled to the processor 101 and memory 104 and/or software stored in the memory 104 executed by the processor 101. The communication engine 108 may be, for example, a network interface card (NIC), a Wi-Fi™ module, a Bluetooth® module and/or any other suitable wired and/or wireless communication device. The communication engine may use, or may include, network components such as a switch, a router, a hub and/or any other network device for coupling in a communicating relationship with other resources such as a remote threat management facility or other network resources accessed by a user of the endpoint. The communication engine 108 may be configured to connect the endpoint 100 to a communication network (not shown in FIG. 1). In some instances, the communication engine 108 may be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. There may be more than one communication engine 108 in a given endpoint 100.

In some instances, the communication engine 108 may facilitate receiving and/or transmitting an analysis object over a communication network, e.g., to a remote threat management facility. In some instances, a file received through the communication engine 108 from a remote computer may be processed by the processor 101 and/or stored in the memory 104.

In use, the security agent 102 may be configured to receive an analysis object such as file 118, from a communication network (not shown in FIG. 1) via the communication engine 108 and/or via any other suitable method (e.g., via a removable memory device). The feature extractor 112 may be configured to access the file 118 and extract a set of features from the file 118 to define a feature vector. This feature vector and/or the set of features may be stored in the memory 104. The feature extractor 112 also may determine contextual information for the file. The contextual information may include, for example, information about the file 118 or information in the file 118 in addition to the relevant content. The contextual information may include, for example, information about the file 118 that is stored, for example, in a database (not shown) or in another file in the memory 104, or that is derived from such information. The machine learning model 114 may retrieve the stored set of features and the contextual information from the memory 104 and analyze the feature vector and the contextual information using the machine learning model 114 and machine learning model data 116. Based on the analysis, the machine learning model 114 may indicate whether the file 118 is malicious by outputting a maliciousness classification, a likelihood of maliciousness, or any other suitable value or set of values useful for evaluating the analysis object. The endpoint 100 may store the maliciousness classification of the file 118 in the memory 104 and may take an action based on the maliciousness classification, such as by initiating a remediation, contacting a network security administrator or other automated or human security resource, or notifying the user of the endpoint.

Figure 2:
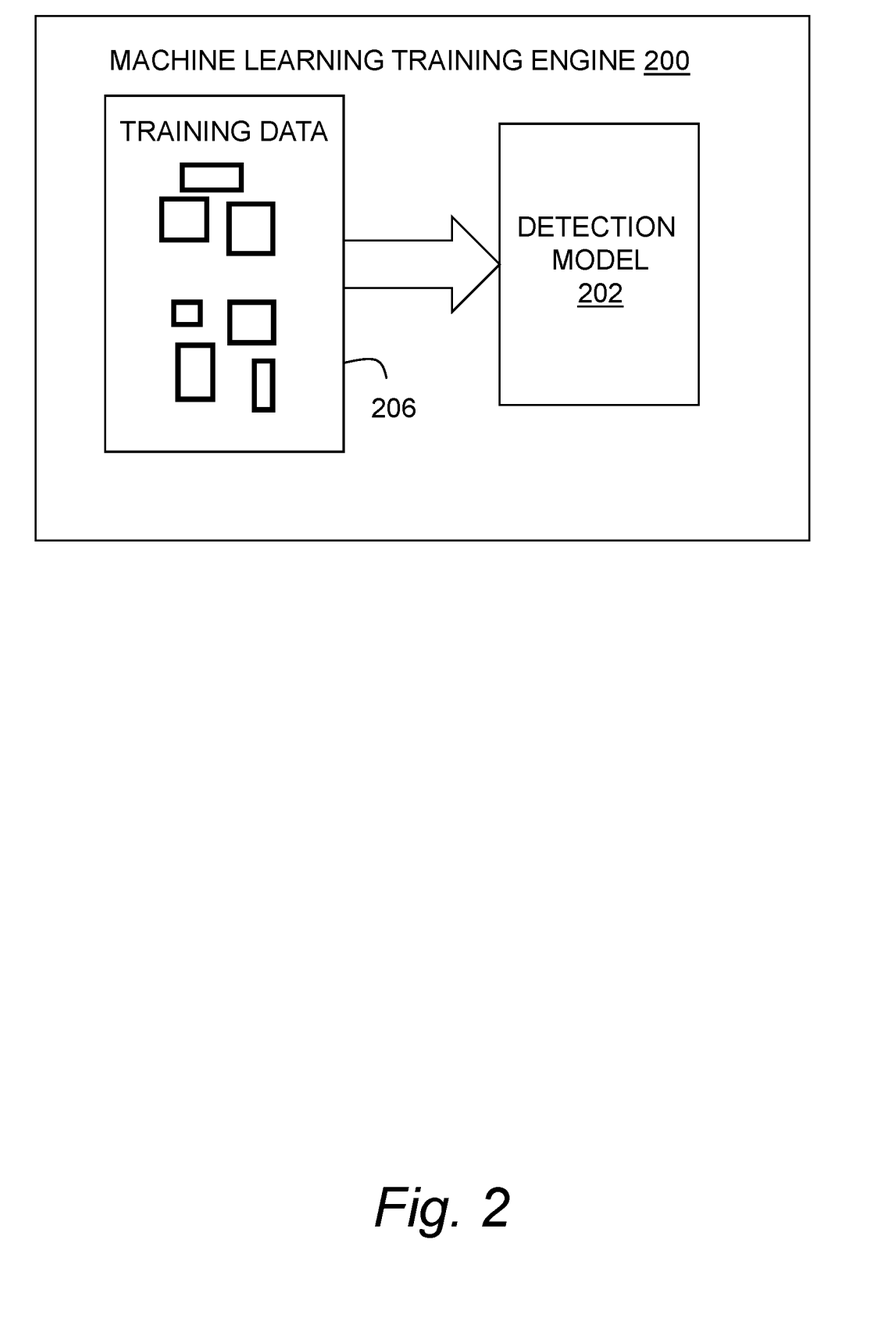
FIG. 2 illustrates a machine learning training engine according to embodiments.

Referring to FIG. 2, an exemplary machine learning training engine 200 includes a detection model 202 and training data 206. Training data 206 may include data used to train a detection model 202 to perform cybersecurity recognition tasks. In some instances, training data 206 can include multiple sets of data. In some implementations, each set of data in the training data 206 may contain at least one set of input information and an associated desired output value or label. The training data 206 typically includes a large amount of data and/or number of sets of data. The training data 206 may include analysis objects and context information for the analysis objects. In some implementations, the training data may include input analysis objects pre-categorized into categories such as, for example, malicious and benign. In some implementations, the training data may include analysis objects with associated threat scores. In some implementations, the training data may include contextual data, such as address information and/or reputation information. In some implementations, the training data 206 may include feature vectors for some files and context information for the files. In some implementations, the training set 206 may include files, context information for the files, and threat scores for files. In some implementations, context information for a given analysis object includes context information from multiple, different observations of that analysis object. For example, for a message, context information may include results from different observations of the file.

Just as one example, analysis objects may be PE files, and the training data may include PE file features derived from applying a feature extractor to each of the PE files.

Figure 3:
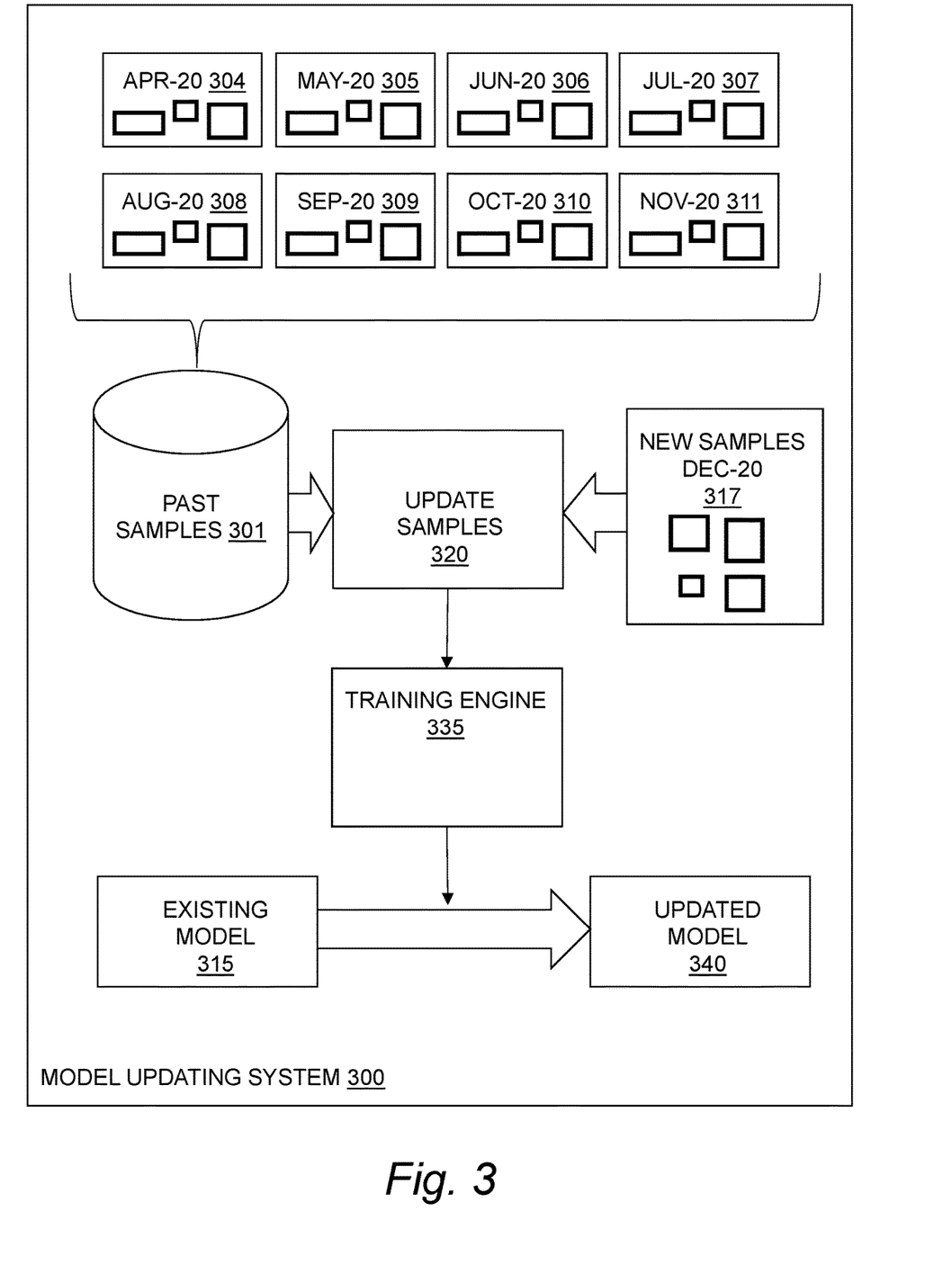
FIG. 3 illustrates model updating according to embodiments.

Referring to FIG. 3, a model updating system 300 may be used to efficiently update a machine learning model. The model updating system 300 is described with respect to an example in which samples are associated with a month (e.g., a month during which samples were observed), and it is desired to update the model with new samples received in the most recent month. For example, if the samples are new malware samples, it may be beneficial to update the model to recognize new malware samples identified and collected each month. At the same time, it is important that the model continue to recognize malware from past samples. While FIG. 3 shows samples in monthly groups, it will be understood that the samples may be grouped over any other suitable time period or time periods, such as yearly, quarterly, weekly, daily, hourly, and so on, depending on the nature of the detection and the frequency and volume of new samples.

In this demonstrative example, the model updating system includes a number of past samples 301. The past samples 301 may include samples that were used to train an existing model 315. In this simplified demonstrative example, exemplary past samples are shown for each of a number of months, which are April 2020 304, May 2020 305, June 2020 306, July 2020 307, August 2020 308, September 2020 309, October 2020 310, and November 2020 311.

It should be understood that the illustrated months are provided by way of non-limiting example, there may be any number of months, each containing any number of samples, and other time ranges may also or instead be used, such as weeks, days, or the like. More generally, the techniques described with respect to the months shown may be extended to any suitable collection of past and new samples, where it may be desired to update a model with additional samples. The "past" samples and "new" samples need not be, and in many cases, are not, created or obtained before or after each other in any particular temporal order. Rather, the "past" samples may simply be samples that were already used or available for the training (or testing) of the existing model 315 regardless of the timing of their creation, receipt, or selection, and "new" samples may be samples that were not already available or used in the training (or testing) of the existing model. While the techniques described may have a particular benefit for models in which samples have been received in chronological groups that are observed to change over time, they are also applicable to scenarios in which additional training data was previously unavailable even if collected earlier, or in which additional training data was not used due to resource limitations or other reasons and it is desired to update the model later in a manner that will include the new samples and avoid forgetting the old samples. That said, the approach described may be generally applicable to models for which analysis objects may change over time and benefit from updates that include more recent training data, such as a scenario where sequential fine-tuning of a model can help maintain model accuracy in recognizing newly-created analysis objects.

In this demonstrative example, it is desired to update the existing model 315 with additional training data, shown here as samples from December 2020 317. In should be understood that the December 2020 317 samples are used in this example as a set of new samples available to update the existing model 315. In this example, rather than train a whole new model (e.g., from scratch) with both the past samples 301 and the new samples 317—a potentially time, labor, and computationally intensive undertaking—the existing model 315 may be updated using update samples 320, where the update samples 320 are advantageously selected both from the past samples 301 and the new samples 317. The update samples 320 may include some or all of the new samples 317 and a subset of the past samples 301. For example, if roughly the same number of samples are identified each month, in this example, there will be 8 months of past samples 301 and one month of new samples 317 available, and there may be (for example) very roughly around the same number as two months of samples included in the update samples 320. For example, the update samples 320 may include some or all of the new samples 317 (understanding that some of the new samples 317 may be reserved for testing data or for other purposes), and a number of past samples 301 selected that is a percentage (for example, 80%-120%) of the number of new samples 317. The number of past samples 301 may be selected from all of the 8 months of past samples 304-311. In general, this may include selecting samples relatively equally from among the past sample sets 304-311, or the selection may be weighted, for example, by time. In general, this may include weighting toward more recent past samples (e.g., October 310 and November 311) or older past samples (e.g., April 304 and May 305). In one aspect, the selection of past samples 301 from the past sample sets 304-311 may advantageously be progressively weighted toward more recent samples, in order to rehearse training (and reinforce classification) preferentially for more recent malware environments. In any case, updating a model with roughly two months of training data will be much more efficient than retraining a model with 9 months of data. Thus, the update samples 320 may be selected as a subset of the available data in the past samples 304-311 and used by the training engine 335 to efficiently update the existing model 315 so as to generate an updated model 340.

In some implementations, a number of the new samples 317 may be determined that will be selected for use in updating. This may, for example, depend on the amount of available data, the amount of retraining to be performed, the amount of data to be reserved for testing, and so forth. A number of past samples 301 may also be determined that will be selected, where the number of past samples 301 may be determined as a percentage of the number of new samples 317 selected for updating. The training engine 335 may update the existing model 315 using the selected new samples 317 and the selected past samples 301. In some implementations, the percentage of the number of new samples 317 may be in the range from 80% to 120% of the number of past samples 301. In some implementations, the percentage of the number of new samples 317 may be in the range from 90% to 110% of the number of past samples 301. In some implementations, the percentage of the number of new samples 317 may be in the range from 95% to 105% of the number of past samples 301.

Figure 4:
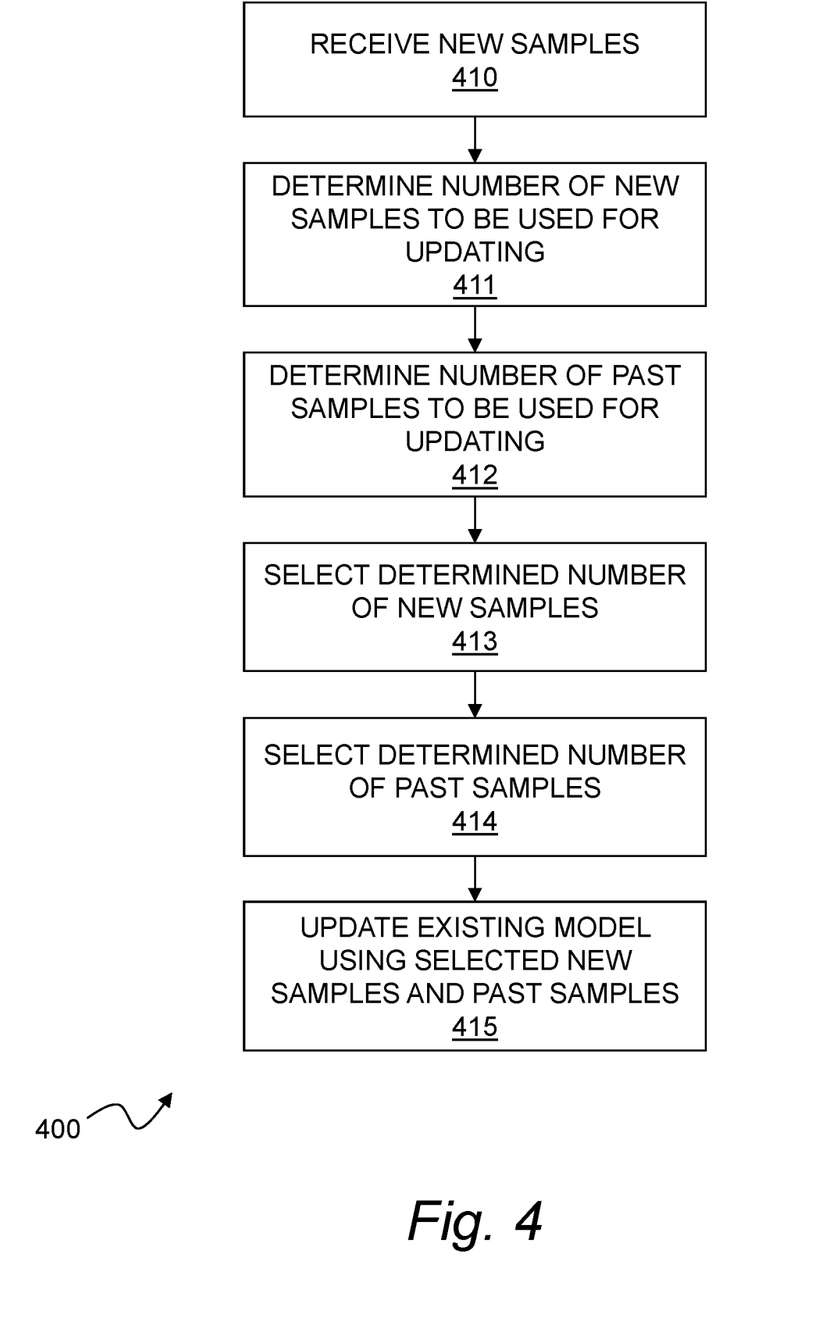
FIG. 4 illustrates a flow chart for machine learning training according to embodiments.

Referring to FIG. 4, as shown in step 410, a method 400 for updating a trained model with new samples may include receiving new samples to be used to update the model. For example, samples may be received incrementally over time and collected, or samples identified during a period of time may be received as single batch at one time, or as a number of discrete batches. A period of time in which samples are collected and used to update a model may be selected based on the analysis objects, the number of new samples, and/or the manner in which the samples are collected. For example, a given period of time may be one or more seconds, minutes, hours, days, weeks, or months, or some combination of these. Samples may be collected during each period, and then used to update the model as described herein.

As shown in step 411, in the method 400, a number of new samples may be determined to be used for updating. The number of new samples may be determined, for example, based on the number of samples received. For example, if 10,000,000 new samples are received, some or all of the samples may be used, so the number of new samples may be 10,000,000 or a number less than 10,000,000. For example, in some implementations, some of the new samples may be allocated for training the model and some of the new samples may be allocated for testing the model. In such an implementation, less than the full number of new samples will be selected for training. In a malware detection environment, a sample set containing millions of samples is not uncommon, which advantageously provides large data sets for excellent machine learning performance, but also poses challenges during computationally expensive training of a neural network or other machine learning system, particularly when the nature of the samples can change significantly over time.

As shown in step 412, in the method 400, a number of past samples to be used for updating may be determined. The number of past samples may be determined based on the number of new samples. For example, if the number of new samples to be used for updating is 10,000,000, a number of past samples may be determined based on determining a number of past samples that is a percentage (e.g., 90%) of the number of new samples that will be used for updating. For example, with 10,000,000 new samples, it may be determined to use 9,000,000 past samples if the number of past samples is determined as 90% of the number of new samples.

A variety of techniques may be used to balance the number of past and new samples before selecting the actual samples for retraining. In general, the selection technique will preferably reserve some number of the new samples for use in testing the incrementally retrained model.

As shown in step 413, in the method 400, once the number of new samples is determined, a corresponding number of samples may be selected from the new samples. These new samples may be selected randomly from the set of new samples. The new samples may be selected with weighting or based on the order in which the new samples were received, or using any other suitable criteria.

As shown in step 414, in the method 400, the number of past samples may be selected based on the determined number of past samples. In some implementations, the number of past samples may be determined as a percentage or a multiple of the number of new samples to be used for updating. In some implementations, the number of past samples is determined based on a desired ratio of past samples and new samples. The past samples may be selected randomly from the set of past samples. In one aspect, the samples may be selected using statistical techniques to incline the sampling toward a statistical distribution of features in the underlying data. In another aspect, the selection may be random or pseudo-random. In one aspect, the past samples may be selected with weighting toward more recent samples in order to bias rehearsal of previously learned patterns toward the more recent malware environment. More generally, the selection may use any suitable weighting criteria or techniques consistent with accuracy of the resulting, retained model.

As shown in step 415, in the method 400, the trained model may be updated using the selected new samples and the selected past samples, which may be combined into a training set for incremental retraining of the machine learning model. In some implementations, updating the trained model includes using machine learning techniques to train the existing model using the selected new samples and the selected past samples. The model may, for example, be a maliciousness classifier, such as a malware classifier, or any other classifier or the like suitable for detecting malware, classifying malware, evaluating a likelihood of malware, and so forth.

In general, the method 400 may be performed periodically to update the trained model using recently collected samples as new samples. The update intervals may be fixed or variable, and may be based, e.g., on trends observed in sample, on performance (e.g., classification accuracy) of the machine learning model when applied to new data sets of current malware samples, resource availability, or any other factors.

Figure 5:
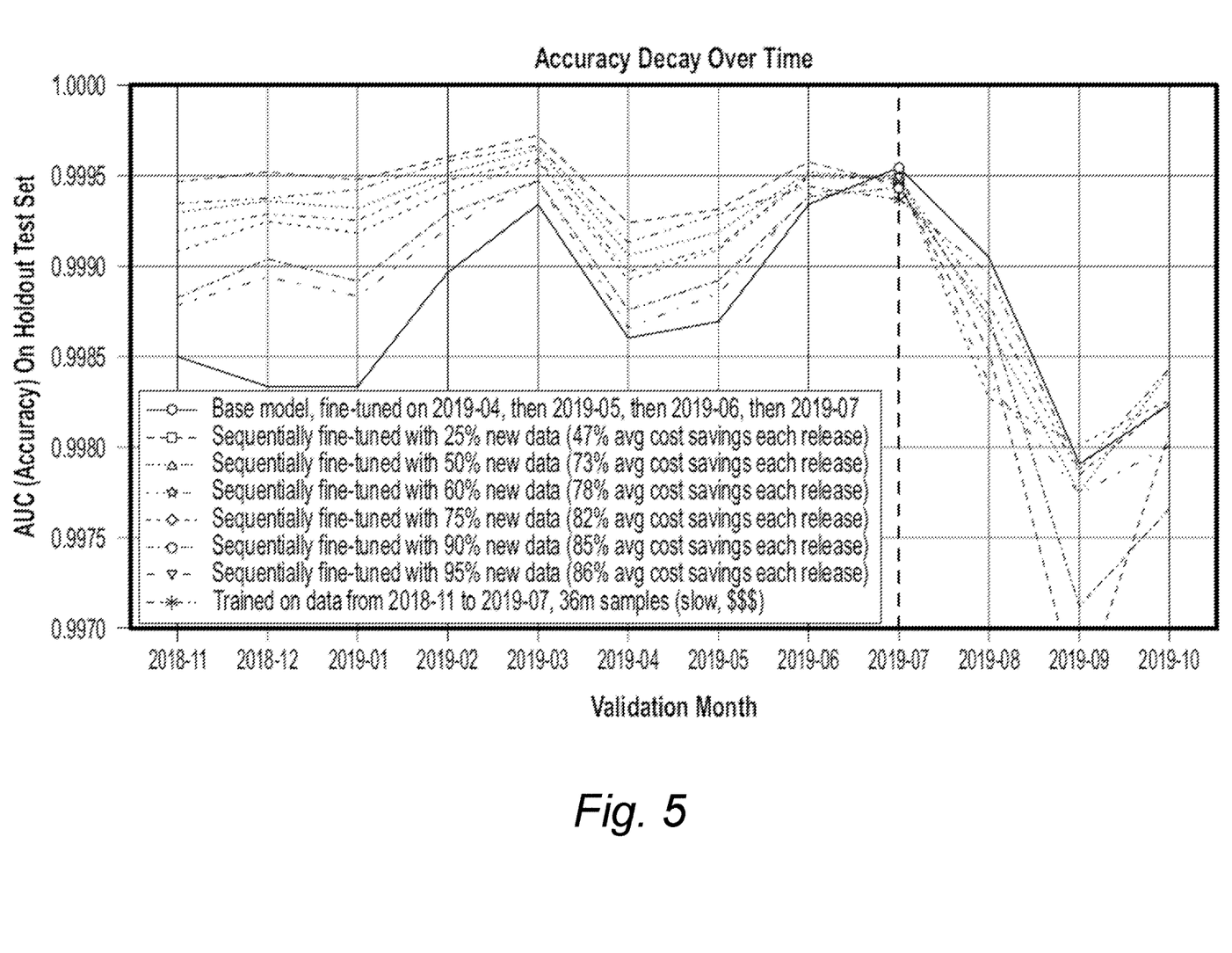
FIG. 5 illustrates example results of training according to embodiments.

Referring to FIG. 5, exemplary results of rehearsal training (fine-tuning) with different percentages (%) of new versus old data without a fixed epoch size is shown, such that 100% new data has the smallest epoch size and is the same as just fine-tuning on new data only with no rehearsal, and smaller numbers incorporate more old data while still training on all new data. The cost savings are different for each option, as shown in the legend. Specifically, the average cost savings is shown over the 4 iterative updates compared to only training on new data during each update. It should be understood that the longer the history of past months (so that the more past samples there are compared to new samples), the larger the cost savings will be. The results represent the cost savings for these experiments, which suggest that even better results may be achieved in production systems.

Figure 6:
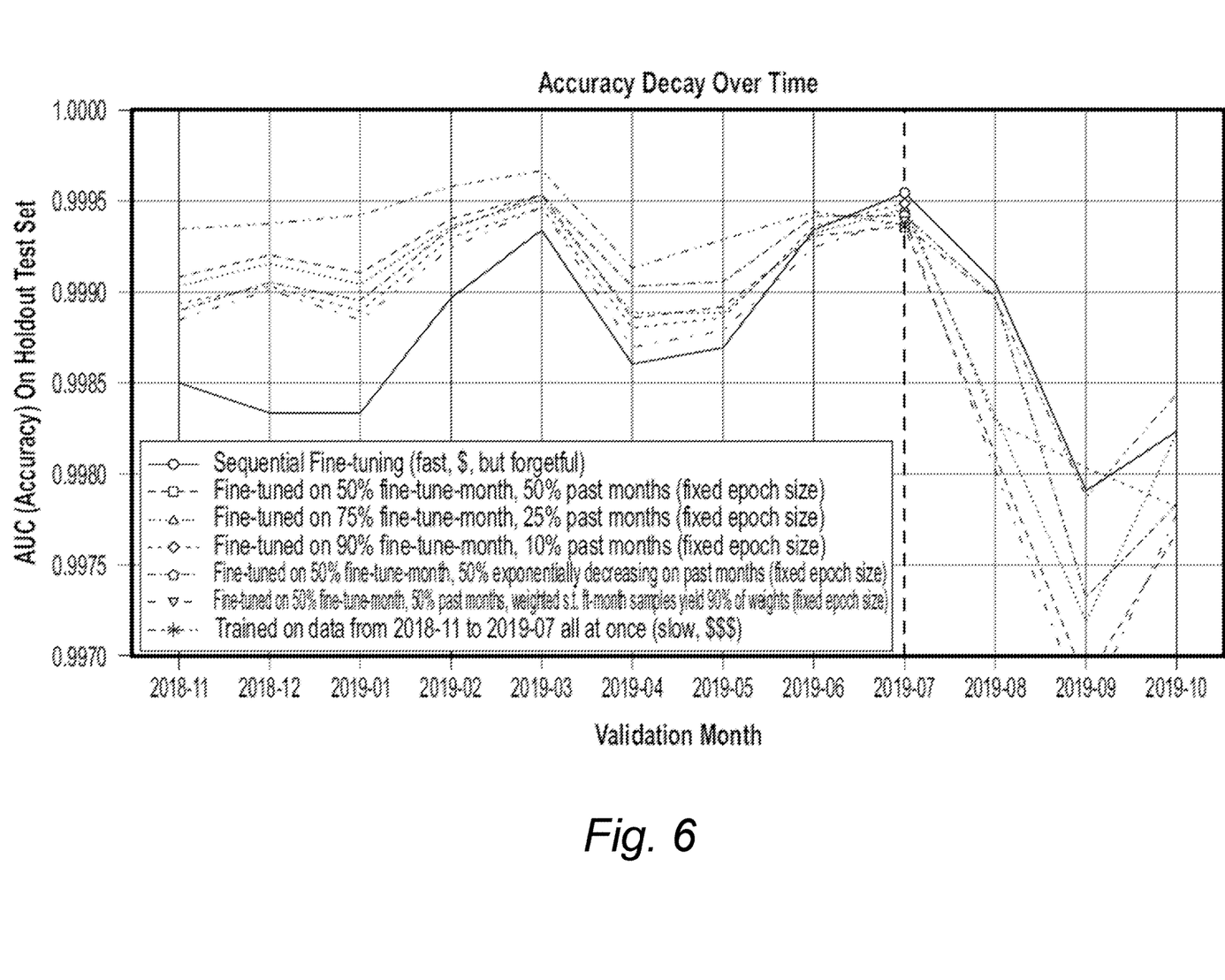
FIG. 6 illustrates example results of training according to embodiments.

FIG. 6 compares various options for rehearsal training to fine tune a model using a fixed epoch size equal to the new training data. In general, the computational cost is equal to simply training on new data only, which is the first line in the key of the graph. For example, sampling from older past months less than 'newer' past months with an exponential (or similar) pattern, may be useful to prioritize minimizing forgetting on more recent months (the fifth line in the key of the graph).

In general, it has been objectively demonstrated that in the context of malware, good classification performance can be achieved for newly arising samples using a simple incremental retraining of a detection model with a suitable mix of old and new malware samples as described herein. More specifically, by approximately doubling the training size of new data (relative to a new data set of, e.g., monthly data) and using half of that to rehearse past data, the model can be very efficiently retrained while preserving overall detection rates well above 99%. Thus, retraining with a suitable mix of old and new data provides a computationally efficient path to automated, incremental retraining without a significant loss of accuracy relative to complete model retraining, and can avoid complex and/or manual techniques such as full retraining or regularization that might otherwise be used to avoid catastrophic forgetting.

For example, L2 regularization is commonly used to reduce the learning rate of a machine learning model by adding a loss penalty for changes to parameters of connections within the neural network when retraining after the initial training. As another example, elastic weight consolidation provides a more flexible regularization technique in which the loss penalty is varied according to an estimated importance of each parameter to the classification task. The approach disclosed herein avoids these more complex techniques for mitigating training-based loss of previously learned classification tasks. The current approach may also reduce computational complexity by avoiding retraining on a full data set. In the context of malware classification, which specifically occurs in the context of large data sets (potentially many millions of samples for each retraining interval) with highly discrete, identifiable features, it has been demonstrated for historical data that complex retraining techniques and/or full model retraining is not required to maintain excellent detection performance.

Where a single model is used, and the model is retrained infrequently, e.g., once a month or once a quarter, the savings achieved by this technique may be modest. However, the approach has particular advantages in circumstances where computational costs matter more than the risk of error, e.g., where the risks to a degradation in performance are relatively small and/or the savings in computation cost are significant. For example, where a malware detection model is retrained very frequently, e.g., on a daily basis, or where the malware detection model is regularly retrained for specific devices or users, significant computational savings may be achieved using this retraining technique. As another example, significant computational savings may accrue where a model is first trained on global data, and then incrementally adapted for different contexts. For example, a malware detection model may be globally trained on all available data, and then incrementally retrained for specific software/hardware platforms, specific arrangements of network assets, specific industries, specific applications, or specific customer detection data. In one aspect, the retraining may be performed to obtain customer-specific models based on private, customer-specific data. This permits an end user to benefit from global learning while applying locally available incremental data to fine tune detection for the customer's environment.

Figure 7:
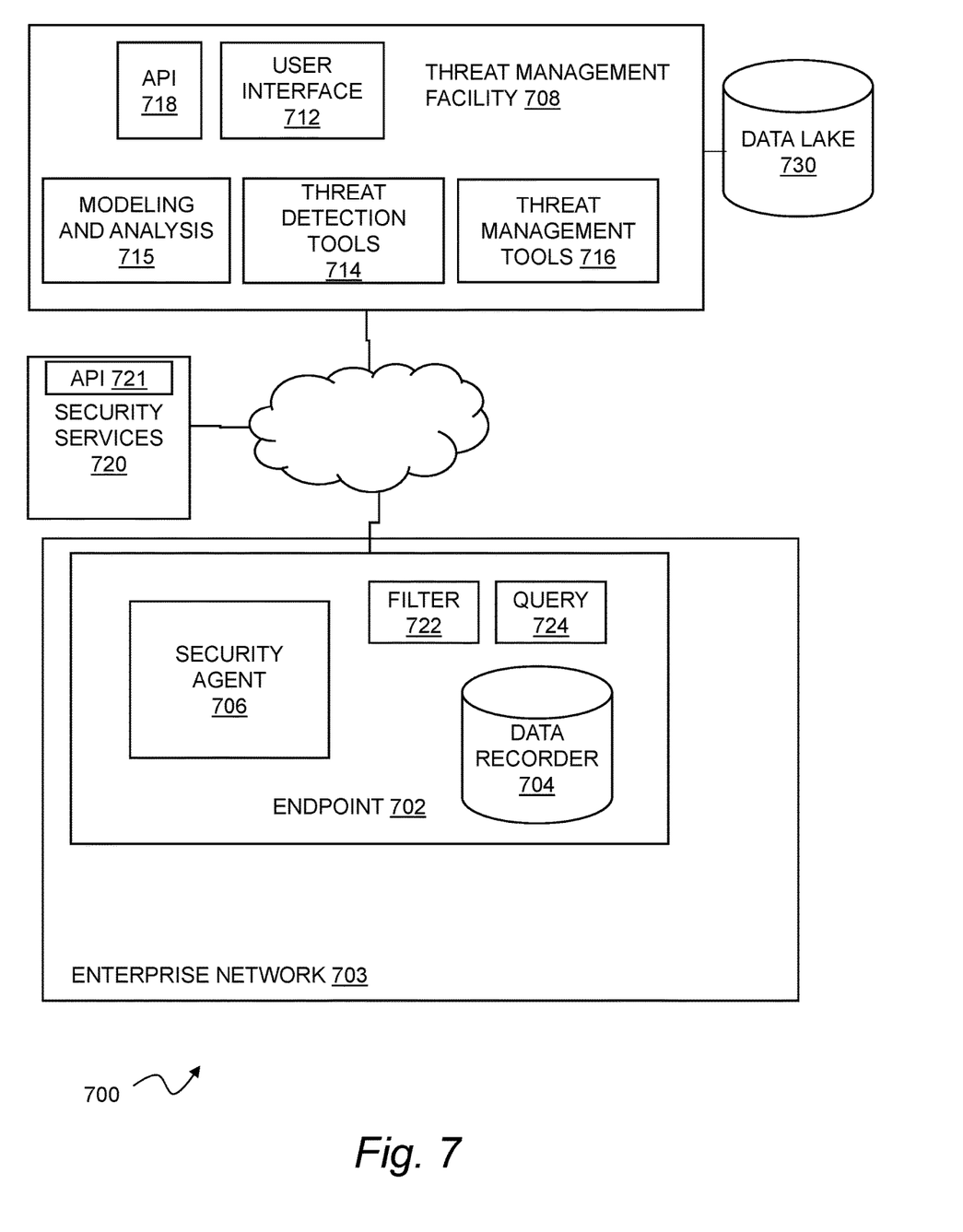
FIG. 7 illustrates a system for enterprise network threat detection according to embodiments.

FIG. 7 shows a system 700 for enterprise network threat detection. The system 700 may use any suitable tools and techniques for threat management, such as those contemplated herein. In the system 700, a number of endpoints such as the endpoint 702 in an enterprise network 703 may log events in a data recorder 704. A local agent on the endpoint 702, depicted here as the security agent 706, may identify events, filter the event data, and feed a filtered data stream to a threat management facility 708. The threat management facility 708 may be a centrally administered threat management facility or local to an enterprise network or collection of enterprise networks. The threat management facility 708 can locally or globally tune filtering by local agents (e.g., the security agent 706) based on the data stream, and can query local event data recorders for additional information where necessary or helpful in threat detection or forensic analysis. The threat management facility 708 may also or instead store and deploy a number of security tools such as a web-based user interface 712 to aid in the identification and assessment of potential threats by a human user. The user interface 712 may be supported by machine learning models. This may, for example, include machine learning analysis of new code samples or models to provide human-readable context for evaluating potential threats. More generally, the threat management facility 708 may provide any of a variety of threat management tools 716 to aid in the detection, evaluation, and remediation of threats or potential threats.

The threat management facility 708 may perform a range of threat management functions. The threat management facility 708 may generally include a user interface 712 for access to threat management and network administration functions, threat detection tools 714, an application programming interface 718 for security services 720 to integrate with threat management facility 708. The threat management facility may also communicate to other security services 720 using an API, such as exemplary API 721 provided by a security service.

The user interface 712 may include a website or other graphical interface or the like, and may generally provide an interface for user interaction with the threat management facility 708, e.g., for threat detection, network administration, audit, configuration and so forth. This user interface 712 may generally facilitate notification and determination of threats and providing controls for a user to dispose of such threats as desired, e.g., by permitting execution or access, by denying execution or access, or by engaging in remedial measures such as sandboxing, quarantining, vaccinating, and so forth.

The threat detection tools 714 may include any suitable threat detection tools, algorithms, techniques, or any other tools or the like useful for detecting threats or potential threats within an enterprise network. This may, for example, include signature based tools, behavioral tools, machine learning models, and so forth. In general, the threat detection tools 714 may use event data provided by endpoints within the enterprise network, as well as any other available data such as network activity, heartbeats, and so forth to detect malicious software or potentially unsafe conditions for a network or endpoints connected to the network. In one aspect, the threat detection tools 714 may usefully integrate event data from a number of endpoints (including, e.g., network components such as gateways, routers, and firewalls) for improved threat detection in the context of complex or distributed threats. The threat detection tools 714 may also or instead include tools for reporting to a separate modeling and analysis module 715, e.g., to support further investigation of security issues, creation or refinement of threat detection models or algorithms, review and analysis of security breaches, and so forth.

The threat management tools 716 may generally be used to manage or remediate threats to the enterprise network that have been identified with the threat detection tools 714 or otherwise. Threat management tools 716 may, for example, include tools for sandboxing, quarantining, removing, or otherwise remediating or managing malicious code or malicious activity, e.g., using any of the techniques described herein.

In general, the application programming interface 718 may support programmatic connections with security services 720, which may be third-party security services. The application programming interface 718 may, for example, connect to Active Directory or other customer information about files, data storage, identities and user profiles, roles, access privileges and so forth. More generally the application programming interface 718 may provide a programmatic interface for customer or other third party context, content, information, administration and security tools, and so forth. The application programming interface 718 may also or instead provide a programmatic interface for hosted applications, identity provider integration tools or services, and so forth.

The endpoint 702 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 702 may generally include a security agent 706 that locally supports threat management on the endpoint 702, such as by monitoring for malicious activity, managing security components on the endpoint 702, maintaining policy compliance, and communicating with the threat management facility 708 to support integrated security protection as contemplated herein. The security agent 706 may, for example, coordinate instrumentation of the endpoint 702 to detect various event types involving various computing objects on the endpoint 702, and supervise logging of events in a data recorder 704. The security agent 706 may also or instead scan computing objects such as electronic communications or files, monitor behavior of computing objects such as executables, and so forth. The security agent 706 may, for example, apply signature-based or behavioral threat detection techniques, machine learning models (e.g. models developed or configured by the modeling and analysis platform 715), or any other tools or the like suitable for detecting malware or potential malware on the endpoint 702.

The data recorder 704 may log events occurring on or related to the endpoint. This may include, for example, detections by a cybersecurity system, for example, implemented in the security agent 706. This may, for example, include events associated with computing objects on the endpoint 702 such as file manipulations, software installations, and so forth. This may also or instead include activities directed from the endpoint 702, such as requests for content from Uniform Resource Locators or other network activity involving remote resources. The data recorder 704 may record data at any frequency and any level of granularity consistent with proper operation of the endpoint 702 in an intended or desired manner.

The endpoint 702 may include a filter 722 to manage a flow of information from the data recorder 704 to a remote resource such as the threat management facility 708. The information from the data recorder 704 may be stored in a data lake 730. In this manner, a detailed log of events may be maintained locally in the data recorder 704 on each endpoint, while network resources can be conserved for reporting of a filtered event stream that contains information believed to be most relevant to threat detection that is stored in the data lake 730. The filter 722 may also or instead be configured to report causal information that causally relates collections of events to one another. In general, the filter 722 may be configurable so that, for example, the threat management facility 708 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 702 may include a query interface 724 so that remote resources such as the threat management facility 708 can query the data recorder 704 remotely for additional information. This may include a request for specific events, activity for specific computing objects, or events over a specific time frame, or some combination of these. Thus for example, the threat management facility 708 may request all detections by one or more cybersecurity systems, changes to the registry of system information for the past forty eight hours, all files opened by system processes in the past day, all network connections or network communications within the past hour, or any other parametrized request for events monitored by the data recorder 704. In another aspect, the entire data log, or the entire log over some predetermined window of time, may be requested for further analysis at a remote resource.

It will be appreciated that communications among security services 720, a threat management facility 708, and one or more endpoints such as the endpoint 702 may be facilitated by using consistent naming conventions across products and machines. For example, the system 700 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

In various implementations, the cybersecurity system evaluation and configuration may be accomplished via the user interface 712, for example, as part of the modeling and analysis component 715 of the threat management facility 708. The modeling and analysis component 715 may access data in one or more data recorders 702 of systems in a target environment (e.g., the enterprise network 703), for example, using the query system 724.

In some implementations, the event data needed for scoring (e.g., cybersecurity system detection events) may already be stored in the data lake 730. In some cases, the event data may be configured to be provided to the data lake 730 by the devices in the target environment (e.g., the enterprise network 703). In some cases, in advance of scoring, the threat management facility 708 may request that the data be communicated by the devices (e.g., endpoint 702) in the target environment (e.g., enterprise network 703) to the data lake 730. The events then may be accessed by the modeling and analysis platform.

Labeled data that may be used to determine initial estimates for a true positive rate and a false positive rate for a given cybersecurity system may be stored, for example, in the data lake 730. Labeled data may be available from a security service 720, for example, using the exemplary API of the security service 721. For example, a security service may offer threat management reports that provide labeled data. The labeled data may be accessed directly from the security server 720 or may be received from a security service and stored in the data lake 730 or another data store.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for updating a previously-trained machine learning malware classification model with new samples, the computer program product comprising computer executable code embodied in a non-transitory computer-readable medium that, when executing on one or more computing devices, performs the steps of:
   receiving new samples to be used to update a previously-trained machine learning malware classification model;
   determining a number of the new samples to be selected for use in updating;
   determining a number of past samples to be selected as a percentage of the number of the new samples to be selected for updating;
   selecting new samples based on the determined number of new samples to provide selected new samples;
   randomly selecting from past samples based on the determined number of past samples to provide a predetermined number of randomly selected past samples; and
   updating the previously-trained model using the selected new samples and the predetermined number of randomly selected past samples.

2. The computer program product of claim 1, wherein the percentage is a percentage is in a range from 80% to 120%.

3. A method for updating a trained model with new samples, the method comprising:
   receiving new samples to be used to update a model;
   determining a number of the new samples to be used for updating;
   determining a number of past samples to select based on the number of the new samples to be used for updating;
   selecting new samples based on the determined number of new samples to provide selected new samples;
   randomly selecting from past samples based on the determined number of past samples to provide a predetermined number of randomly selected past samples; and
   updating the trained model using the selected new samples and the predetermined number of randomly selected past samples.

4. The method of claim 3, wherein updating the trained model comprises using machine learning techniques to train an existing model using the selected new samples and the predetermined number of randomly selected past samples.

5. The method of claim 3, wherein the model is a malware classifier.

6. The method of claim 3, where in the model is a maliciousness classifier.

7. The method of claim 3, wherein the number of past samples is determined as a percentage or a multiple of the number of new samples to be used for updating.

8. The method of claim 3, wherein the number of past samples is determined based on a desired ratio of past samples and new samples.

9. The method of claim 3, wherein the method is performed periodically to update the trained model using recently collected samples as new samples.

10. The method of claim 3, wherein the number of new samples is determined by identifying a number of new samples to be used as test data.

11. The method of claim 3, wherein the number of new samples is determined by identifying a number of new samples to be used as training data.

12. The method of claim 3, wherein the predetermined number of randomly selected past samples are randomly selected with weighting toward more recent past samples.

13. The method of claim 3, wherein the predetermined number of randomly selected past samples are randomly selected with weighting toward a statistical distribution of features in underlying data.

14. A system for maintaining a trained model with new samples, the system comprising:
   a sample repository including a memory for receiving new samples to be used to update the model;
   a new sample number determination system for determining a number of the new samples to be used for updating and for determining a number of past samples to select based on the number of the new samples to be used for updating;
   a sample selector for selecting new samples based on the determined number of new samples to provide selected new samples and for randomly selecting from past samples based on the determined number of past samples to provide a predetermined number of randomly selected past samples;
   a training engine for updating the trained model using the selected new samples and the predetermined number of randomly selected past samples; and
   a security agent for using the updated trained model to detect malware, wherein the new sample number determination system, the sample selector, the training engine, and the security agent include one or more processors configured by non-transitory computer executable code to perform corresponding functions.

15. The system of claim 14, wherein the new samples are updated periodically.

16. The system of claim 14, wherein the trained model is a malware classifier.

17. The system of claim 14, wherein the trained model is a deep learning neural network.

18. The system of claim 14, wherein the new sample number determination system determines the number of new samples by identifying a number of new samples to be used as training data.

19. The system of claim 14, wherein the new sample number determination system determines the number of past samples based on a percentage of the number of new samples.

20. The system of claim 14, wherein the predetermined number of randomly selected past samples are selected randomly with weighting toward more recent samples.

* * * * *